United States Patent [19]

Omura et al.

[11] Patent Number: 5,378,788
[45] Date of Patent: Jan. 3, 1995

[54] PROCESS FOR PREPARATION OF LINEAR ORGANO-POLYSILOXANE HAVING HYDROXYL GROUP AT ITS MOLECULAR ENDS

[75] Inventors: Naoki Omura; Minoru Igarashi, both of Annaka, Japan

[73] Assignee: Shin-Etsu Chemical Co., Ltd., Tokyo, Japan

[21] Appl. No.: 90,970

[22] Filed: Jul. 15, 1993

[30] Foreign Application Priority Data

Jul. 16, 1992 [JP] Japan .................. 4-212148

[51] Int. Cl.[6] ................................ C08G 77/06
[52] U.S. Cl. .............................. 528/10; 528/12
[58] Field of Search ............................ 528/10, 12

[56] References Cited

U.S. PATENT DOCUMENTS 4,990,555  2/1991  Trego et al. .................. 528/23
5,057,620 10/1991  Inoue et al. .................. 556/459
5,198,518  3/1993  Yamamoto et al. ............. 528/12

FOREIGN PATENT DOCUMENTS 1-009231  1/1989  Japan .......................... 528/12

*Primary Examiner*—Ralph H. Dean
*Assistant Examiner*—Mark D. Sweet
*Attorney, Agent, or Firm*—Oblon, Spivak, McClelland, Maier & Neustadt

[57] ABSTRACT

A process for preparation of a linear organopolysiloxane having a hydroxyl group at both molecular ends thereof, comprising the steps of: mixing a dialkoxysilane having the following general formula (1):

$$Si(R^1)(R^2)(OR^3)_2 \qquad (1)$$

wherein $R^1$ and $R^2$ are each a substituted or unsubstituted monovalent hydrocarbon group, and $R^3$ is a methyl or ethyl group, or a partial hydrolyzate of said dialkoxysilane with an aqueous acid solution of pH 1.0–5.0, thereby permitting hydrolysis and condensation to take place; adding a metal oxide to the reaction mixture to adjust the reaction system to pH 6.0–9.0; and removing water and by-produced alcohols from the reaction mixture. By the process, linear organopolysiloxanes having a hydroxyl group at both molecular ends thereof can be prepared extremely easily from dialkoxysilanes, such as dimethoxydimethylsilane, which are inexpensive. The process is highly advantageous for preparation of low molecular weight, terminal hydroxyl-containing linear organopolysiloxanes useful as dispersing agent for silicone rubber.

6 Claims, 3 Drawing Sheets

PROCESS FOR PREPARATION OF LINEAR ORGANO-POLYSILOXANE HAVING HYDROXYL GROUP AT ITS MOLECULAR ENDS

BACKGROUND OF THE INVENTION

1. Field of the Invention

The present invention relates to a process for preparation of linear organopolysiloxanes having a hydroxyl group at both terminal ends of molecular chain thereof.

2. Description of the Prior Art

Linear organopolysiloxanes having hydroxyl groups at both terminal ends thereof are known to be effective as a dispersing agent in the production of silicone rubber compounds. The performance of this type of organopolysiloxane as dispersing agent increases with the proportion of the hydroxyl groups in the organopolysiloxane. Of the polysiloxanes having hydroxyl groups at both terminal ends thereof, those containing hydroxyl groups in higher proportions, namely, lower-molecular-weight linear organopolysiloxanes with silanol groups at both terminal ends have greater dispersing effects than those containing hydroxyl groups in lower proportions (i.e. higher-molecular-weight polysiloxanes). Therefore, the low-molecular-weight linear organopolysiloxanes have the advantage that, in their use as a dispersing agent for producing a silicone rubber compound, they can be used in a reduced amount, offering another advantage of not impairing processability of the silicone rubber compound.

There have been many studies of methods for preparation of low-molecular-weight linear organopolysiloxanes having hydroxyl groups at both terminal ends thereof. As a preparation method on a laboratory basis, there is known a process in which an alkoxysilane or the like is hydrolyzed in a solution maintained in a neutral condition by use of a buffer or the like. This process, however, is difficult to carry out on an industrial basis. A process in which dimethoxysilane is mixed with an excess of distilled water and refluxed is also known, but according to the process, the yield of the desired product is low.

At present the linear organopolysiloxanes as above-described are produced industrially by subjecting a linear organochlorosiloxane or chlorosilane having chlorine atoms at both its terminal ends to hydrolysis using a weakly alkaline aqueous solution such that cyclic polysiloxanes would not be formed. Due to the instability of the silanol group to acids and alkalis, however, this process involves the problem that HCl formed upon the hydrolysis causes a condensation reaction between the silanol groups, resulting in the formation of higher-molecular-weight organopolysiloxanes and cyclic polysiloxanes in addition to the desired organopolysiloxane. According to the process, therefore, it is very difficult to synthesize a desired low-molecular-weight organopolysiloxane unless neutrality of the reaction system is strictly maintained.

Also known is a process in which the above organochloropolysiloxane is acetoxylated with acetic acid, followed by hydrolysis. However, the process has the drawback that complete hydrolysis is difficult to accomplish and some acetoxyl groups will be left in the reaction product. The organopolysiloxane thus obtained with the residual acetoxyl groups therein is unsuitable for use as a dispersing agent in producing silicone rubber compounds.

U.S. Pat. No. 3,925,285 discloses a process in which a $D_3$ siloxane (hexamethylcyclotrisiloxane; D stands for a difunctional organosiloxane unit), methanol, formic acid and water are reacted to produce a low-molecular-weight linear polyorganosiloxane having terminal silanol group together with some residual methoxyl groups. This process has the drawback of high cost due to the use of a relatively expensive $D_3$ type siloxane. In addition, the reactions used in the process do not produce a silanol-terminated low-molecular-weight polyorganosiloxane containing less than three D units. Besides, in view of the reactions, it is impossible to produce a polyorgano-siloxane smaller than 1,5-dihydroxytrisiloxane in chain length. Thus, there is a limitation on the proportion of hydroxyl groups in the reaction product.

U.S. Pat. No. 5,057,620 discloses a process in which a chlorosiloxane (of $D_3$ type) is added dropwise to a solvent based on an epoxy compound, such as propylene oxide or butylene oxide, and containing water. However, the use of a comparatively expensive $D_3$ type siloxane is disadvantageous economically, and the low boiling point of the solvent used leads to problems in safety, such as electrostatic ignition.

As the range of silicone rubber applications has expanded more and more, the price of silicone rubbers has been decreasing markedly. It is therefore very important to prepare silicone rubbers at lower cost, and it is highly profitable to synthesize inexpensively a dispersing agent for use in formulating silicone rubber compounds.

SUMMARY OF THE INVENTION

It is accordingly an object of the present invention to provide a process by which silanol-terminated, low-molecular-weight linear polyorganosiloxanes, useful as a dispersing agent in production of silicone rubbers, can be easily prepared from comparatively inexpensive dialkoxysilanes, such as dimethoxydimethylsilane, instead of from expensive starting materials.

In order to attain the above object, the present invention provides a process for preparation of a linear organopolysiloxane having a hydroxyl group at both terminal ends of its molecular chain, comprising the steps of:

mixing a dialkoxysilane having the following general formula (1):

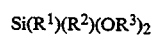

$$Si(R^1)(R^2)(OR^3)_2 \qquad (1)$$

wherein $R^1$ and $R^2$ are each a substituted or unsubstituted monovalent hydrocarbon group, and $R^3$ is a methyl group or an ethyl group, or a partial hydrolyzate of said dialkoxysilane with an aqueous acid solution having a pH of from 1.0 to 5.0, thereby permitting hydrolysis and condensation to take place;

adding a metal oxide to the reaction mixture to adjust the pH of the reaction system to a value in the range from 6.0 to 9.0; and removing water and by-produced alcohols from the reaction mixture.

In the present invention, the metal oxide is used as a neutralizing agent, and acts as a reaction terminator. That is, the metal oxide is soluble in acidic aqueous solutions to exhibit a neutralizing action, but it is insoluble in neutral or alkaline aqueous solutions. By addition of the metal oxide, according to the present invention, the reaction system is maintained in the pH range of from 6.0 to 9.0, whereby the resulting linear organopolysiloxane having a hydroxyl group at both terminal ends of its molecular chain is effectively prevented from undergoing further condensation. Accordingly, the desired polysiloxane with an aimed molecular weight can be synthesized easily.

DETAILED DESCRIPTION OF THE INVENTION

Starting Material

Figure 1:
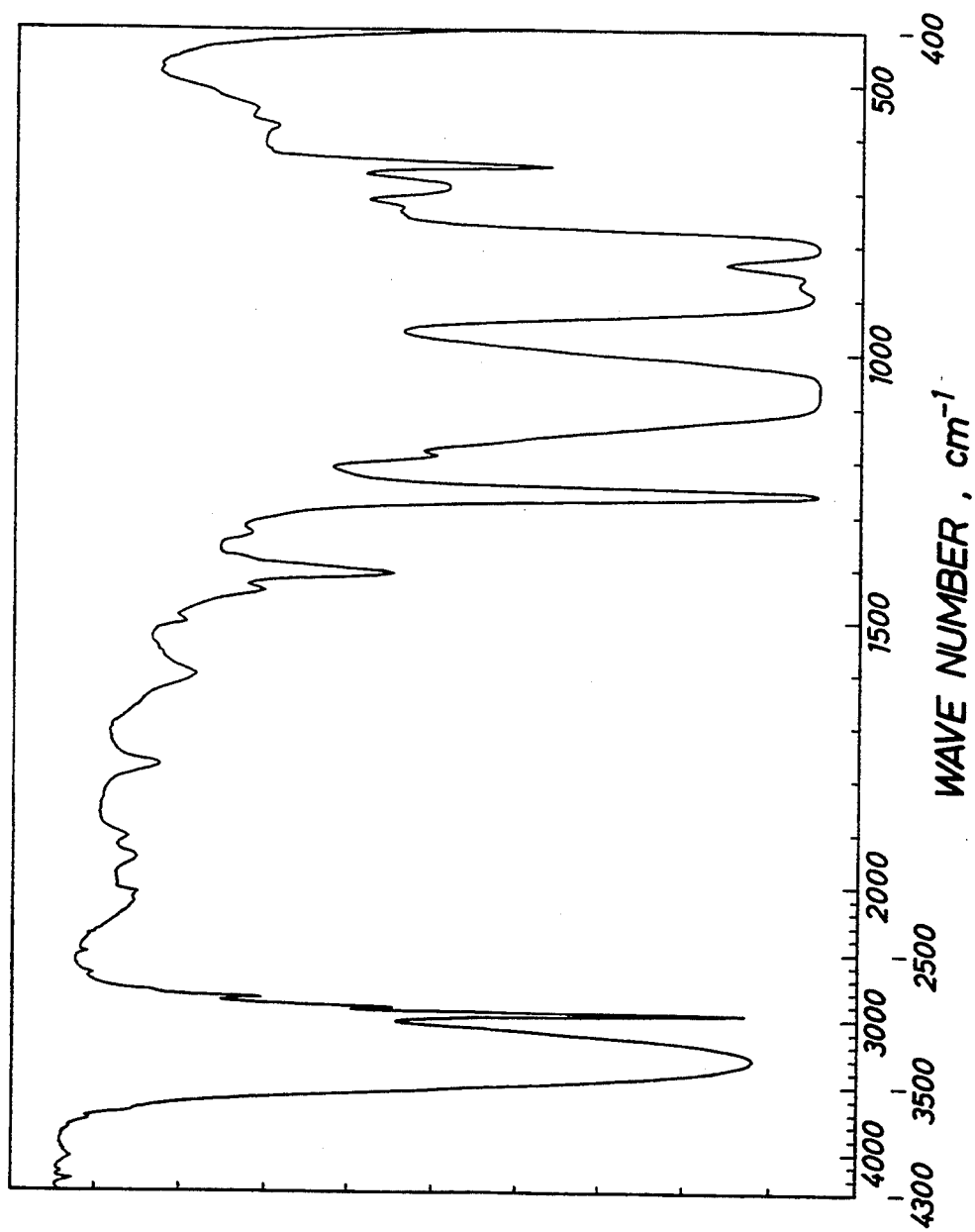
FIG. 1 shows an infrared spectrophotometric chart for an organopolysiloxane obtained in Example 1.

In the present invention, a dialkoxysilane having the above general formula (1) is used as a starting material. Such alkoxysilanes are relatively inexpensive, and use thereof as starting material is highly advantageous economically.

In the above general formula (1), $R^1$ and $R^2$ are each a substituted or unsubstituted monovalent hydrocarbon group. Specifically, the substituted or unsubstituted monovalent hydrocarbon groups include, for example, alkyl groups such as methyl, propyl, butyl, pentyl, hexyl, octyl, decyl, dodecyl and the like; alkenyl groups such as vinyl, allyl and the like; aryl groups such as phenyl, tolyl and the like; aralkyl groups such as β-phenylethyl and the like; and groups derived from the just-mentioned hydrocarbon groups by substitution of part or all of the carbon-bonded hydrogen atoms with a halogen atom such as fluorine, etc. or with a cyano group, for example, 3,3,3-trifluoropropyl, cyanoethyl and the like. Among these monovalent hydrocarbon groups, preferred are methyl, vinyl and phenyl groups.

The two $R^3$ groups in the formula (1) may be the same or different from each other and are each an alkyl group of from 1 to 10 carbon atoms, preferably an alkyl group of from 1 to 4 carbon atoms, more preferably a methyl group or an ethyl group.

Particularly preferred, but not limitative, examples of the dialkoxysilane for use as the starting material in the present invention include dimethyldimethoxysilane, phenylmethyldimethoxysilane, methylvinyldimethoxysilane, dimethyldiethoxysilane, phenylmethylmethoxyethoxysilane and the like.

The dialkoxysilanes as above may be used either singly or in combination of two or more. It should be noted, however, that where a plurality of alkoxysilanes are used in combination, reaction may not proceed uniformly because of the different rates of hydrolysis of the alkoxysilanes.

Aqueous Acid Solution

According to the present invention, hydrolysis of the dialkoxysilane and the following condensation reaction are carried out using an aqueous acid solution with a pH ranging from 1.0 to 5.0, preferably from 3.0 to 5.0. the pH is too low, hydrolysis takes place so quickly that a low molecular weight organopolysiloxane with a hydroxyl group at both terminal ends cannot be obtained easily and cyclization may take precedence over the desired reaction. If the pH is too high, on the other hand, the solution cannot produce a catalytic action necessary for hydrolysis, so that the desired hydrolysis does not proceed.

The acids which can be used for adjusting the pH of the reaction system in the present invention include, for example, inorganic acids such as hydrochloric acid, sulfuric acid, nitric acid and the like, and organic acids such as formic acid, acetic acid and the like. Of these acids, most preferred is hydrochloric acid.

The amount of the aqueous acid solution used, in terms of water quantity, is from 0.5 to 3.0 moles, preferably from 1.0 to 1.5 moles, per mole of alkoxyl groups possessed by the dialkoxysilane or partial hydrolyzate thereof. If the amount of the solution is below the range described, the alkoxyl groups are not completely hydrolyzed and hydroxyl groups are formed only in a small amount. If the amount of the solution is too large, special steps such as separation are required to remove the solution after the reactions are finished.

Reactions

The hydrolysis of the dialkoxysilane or partial hydrolyzate thereof and other reactions, caused by mixing the starting material with the aqueous acid solution as described above, are normally carried out at a temperature ranging from about 0° C. to about 50° C. In carrying out the reactions, it is preferable to maintain the reaction system under stirring, for achieving uniform reaction.

Metal Oxide

The metal oxide used in the process of the present invention acts as a reaction terminator. By addition of the metal oxide, the above-described acid is neutralized and the hydrolysis and condensation reaction of the dialkoxysilane or partial hydrolyzate thereof is stopped. Therefore, by adding the metal oxide at a suitable time after the reaction is initiated, it is possible to obtain a linear organopolysiloxane having a hydroxyl group at both terminal ends thereof with a desired polymerization degree, and hence to obtain an organopolysiloxane having a low polymerization degree (namely, a high hydroxyl content). Where such a metal oxide is not added, the silanol groups of the organopolysiloxane formed are unstable to acids and alkalis, so that further condensation occurs between the silanol groups. In such a case, it is impossible to obtain an organopolysiloxane with a desired polymerization degree.

As the metal oxide, for example, magnesium oxide, manganese oxide, calcium oxide and the like can be used either singly or in combination of two or more. Among the metal oxides usable, preferred is magnesium oxide.

The metal oxide is used in an amount such that the pH of the reaction system is in the range from 6.0 to 9.0. If the pH is below 6.0, the reaction cannot be stopped effectively. The metal oxide is soluble in acidic solutions but insoluble in alkaline solutions; accordingly, the pH of the reaction system cannot exceed 9.0. The amount of the metal oxide necessary for adjusting the pH of the reaction system to within the above-described range is, in terms of theoretical amount, at least 1.0 equivalent per equivalent of the acid used for the hydrolysis. The metal oxide may be used in an excess amount.

After the addition of the metal oxide, the reaction system is subjected to known purification steps such as vacuum distillation, etc. to remove unreacted starting material, by-produced alcohols as well as water and the like, whereby the desired organopolysiloxane is obtained. Such organopolysiloxane preferably has a polymerization degree of from 2 to 100, more preferably from 2 to 10.

EXAMPLES

Example 1

A 200-ml flask equipped with thermometer and stirrer was charged, after replacement of the inside atmosphere by nitrogen, with 66.92 g (0.557 mol) of dimethyldimethoxysilane and 21.94 g (1.219 mol) of aqueous hydrochloric acid adjusted to pH 4.2, and the resulting two-phase mixture was stirred vigorously at room temperature. The mixture became uniform after 7 minutes of stirring.

After the uniform mixture was stirred at room temperature for 43 minutes, 0.2 g ($4.96 \times 10^{-3}$ mol) of magnesium oxide was added thereto, whereby the HCl as a catalyst was neutralized.

Then 10 g (0.0831 mol) of anhydrous magnesium sulfate was added to the reaction mixture, followed by stirring at room temperature for 3 hours in order to eliminate excess water. The resulting mixture was filtered, and an oily matter thus obtained was subjected to stripping at room temperature under a pressure of 2 mmHg for 3 hours to remove methanol and unreacted starting material therefrom, giving 36.81 g of a colorless transparent oily substance.

The oily substance thus obtained had a viscosity of 22.2 cSt at 25° C.

The oily substance was analyzed by IR absorption spectrum, NMR, hydroxyl number and methoxyl number measurements. The results are given below.

- IR absorption spectrum: (shown in FIG. 1)
  $3700-2800$ cm$^{-1}$ (-OH, broad, strong)
  $2970$ cm$^{-1}$ (-CH$_3$, sharp)
- $^1$HNMR:
  δ (ppm)
  5.5 (0.9 H, OH)
  3.5 (1.8 H, OMe)
  0.2 (18 H, Si-Me)
- OH number (measured by the Grignard method): 0.45 mol/100 g
- Methoxyl number: 0.12 mol/100 g The above results show that the oily product obtained was a hydroxyl-terminated linear dimethylpolysiloxane.

Comparative Example 1

A 50-ml flask equipped with thermometer and stirrer was charged, after replacement of the inside atmosphere by nitrogen, with 8.0 g (0.067 mol) of dimethyldimethoxysilane and 7.6 g (0.14 mol) of aqueous hydrochloric acid adjusted to pH 5.2, to form a two-phase system. When the two-phase mixture was stirred at room temperature for 5 hours, the mixture did not became a homogeneous system but remained as a two-phase system. Upon analysis by gas chromatography, the organic phase was found to consist substantially of the starting material dimethyldimethoxysilane.

EXAMPLE 2

A 50-ml flask equipped with thermometer and stirrer and purged with nitrogen was charged with 20.0 g (0.166 mol) of dimethyldimethoxysilane and 6.58 g (0.366 mol) of aqueous hydrochloric acid adjusted to pH 1.4, whereon the internal temperature rose to a maximum of 50° C. and a homogeneous solution was formed. After stirring of the solution was continued for 5 minutes, 0.2 g ($4.96 \times 10^{-3}$ mol) of magnesium oxide and 15 g (0.125 mol) of anhydrous magnesium sulfate were added to the solution, followed by stirring for 3 hours. The resulting mixture was subjected to filtration and then to stripping at room temperature under a pressure of 1 mmHg. Upon the stripping, 8.1 g of a colorless transparent oily substance was obtained, which had a viscosity of 35.3 cSt at 25° C.

Figure 2:
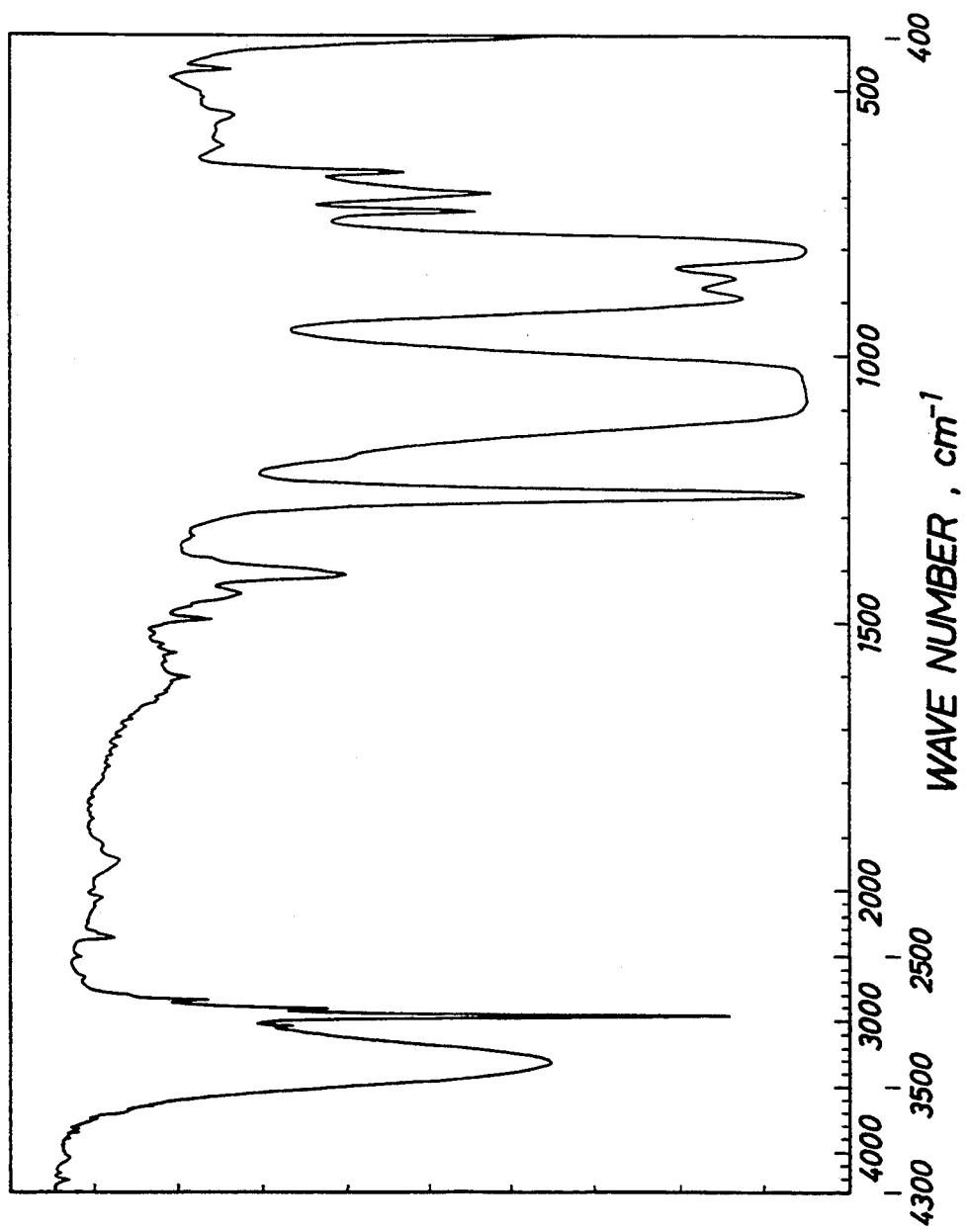
FIG. 2 shows an infrared spectrophotometric chart for an organopolysiloxane obtained in Example 2.

An IR absorption spectrum measured on the oily reaction product is shown in FIG. 2. The spectrum indicates weaker absorption due to OH group, as compared with the spectrum measured on the reaction product of Example 1. This suggests that the oily product obtained in this example had an increased molecular weight as a result of condensation.

EXAMPLE 3

A 100-ml flask equipped with thermometer and stirrer and purged with nitrogen was charged with 36.5 g (0.200 mol) of dimethoxyphenylmethylsilane and 7.9 g (0.44 mol) of aqueous hydrochloric acid adjusted to pH 3.2, and the resulting two-phase mixture was stirred vigorously at room temperature. After 1 hour of stirring, a transparent uniform solution was obtained which had a risen temperature of 30° C.

Immediately thereafter, 0.2 g ($4.96 \times 10^{-3}$ mol) of magnesium oxide was added to the solution, to neutralize the catalyst HCl.

The neutralized solution was admixed with 10 g (0.0831 mol) of anhydrous magnesium sulfate, followed by stirring at room temperature for 3 hours in order to eliminate excess water. The resulting mixture was filtered, and an oily matter thus obtained was subjected to stripping at room temperature under a pressure of 2 mmHg for 3 hours to remove methanol and unreacted starting material therefrom. Upon the stripping, a colorless transparent oily substance was obtained in a 59% yield, with a viscosity of 302 cSt at 25° C.

The oily product was analyzed in the same manner as in Example 1. The results are given below.

Figure 3:
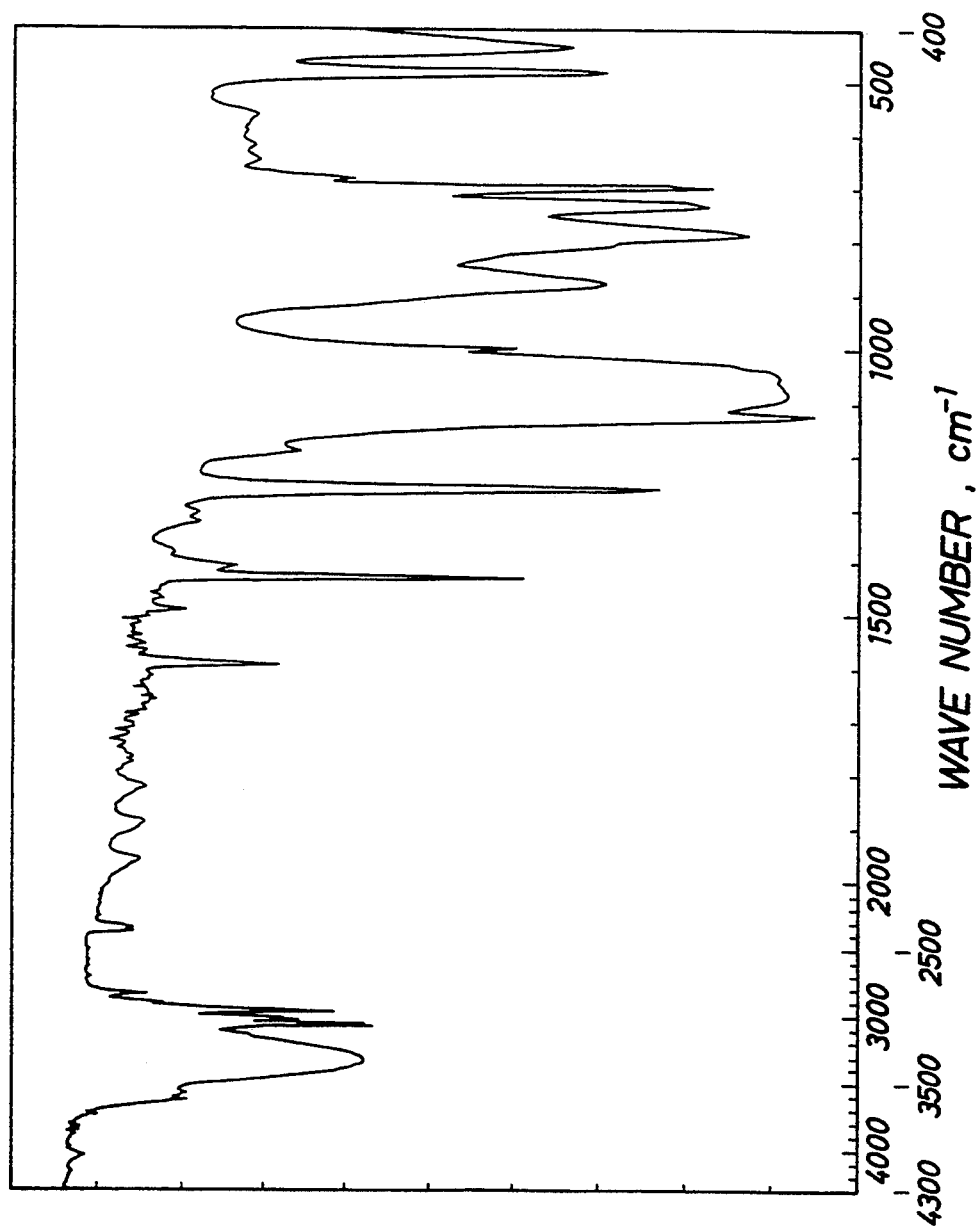
FIG. 3 shows an infrared spectrophotometric chart for an organopolysiloxane obtained in Example 3.

- IR absorption spectrum: (shown in FIG. 3)
  $3700-2800$ cm$^1$ (-OH, broad, strong)
  $3070, 3050, 2960$ cm$^1$ (-CH$_3$, sharp)
  $1600, 1430$ cm$^1$ (-Ph, sharp)
- $^1$HNMR:
  δ (ppm)
  8.0–7.2 (15 H, Ph-)
  5.6 (0.9 H, OMe)
  3.7–3.2 (1.2 H, OMe)
  0.2 (9 H, Si-Me)
- Refractive index (25° C.): 1.5365
- OH number (measured by the Grignard method): 0.32 mol/100 g
- Methoxyl number: 0.15 mol/100 g

We claim:

1. A process for preparation of a linear organopolysiloxane having a hydroxyl group at both terminal ends of its molecular chain, comprising the steps of:
   mixing a dialkoxysilane having the following general formula (1):

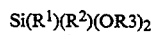

$$\text{Si}(R^1)(R^2)(OR^3)_2 \tag{1}$$

wherein $R^1$ and $R^2$ are each a substituted or unsubstituted monovalent hydrocarbon group, and $R^3$ is a methyl group or an ethyl group, or a partial hydrolyzate of said dialkoxysilane with an aqueous acid solution having a pH of from 1.0 to 5.0, thereby permitting hydrolysis and condensation to take place;

adding a metal oxide to the reaction mixture to adjust the pH of the reaction system to a value in the range from 6.0 to 9.0; and removing water and by-produced alcohols from the reaction mixture.

2. The process of claim 1, wherein said aqueous acid solution is used in an amount such that the amount of water is from 0.5 to 3.0 moles per mole of alkoxyl groups in said alkoxysilane or partial hydrolyzate thereof.

3. The process of claim 1, wherein said aqueous acid solution has a pH of from 3.0 to 5.0.

4. The process of claim 1, wherein said aqueous acid solution comprises hydrochloric acid.

5. The process of claim 1, wherein said hydrolysis and condensation reaction is carried out at a temperature of from 0° to 50° C.

6. The process of claim 1, wherein said metal oxide comprises at least one of magnesium oxide, manganese oxide and calcium oxide.

* * * * *